United States Patent
Biagi et al.

(10) Patent No.: US 10,099,596 B1
(45) Date of Patent: Oct. 16, 2018

(54) RISER APPARATUS AND SYSTEM FOR VEHICLE TRANSPORT

(71) Applicant: Cottrell, Inc., Gainesville, GA (US)

(72) Inventors: Gerard P. Biagi, Sugar Hill, GA (US); Steven Thomas Sexton, Lawrenceville, GA (US)

(73) Assignee: Cottrell, Inc., Gainesville, GA (US)

(*) Notice: Subject to any disclaimer, the term of this patent is extended or adjusted under 35 U.S.C. 154(b) by 0 days.

(21) Appl. No.: 15/892,714

(22) Filed: Feb. 9, 2018

(51) Int. Cl.
- *B60P 1/43* (2006.01)
- *B62D 53/06* (2006.01)
- *B60P 3/07* (2006.01)

(52) U.S. Cl.
CPC .............. *B60P 1/43* (2013.01); *B60P 3/07* (2013.01); *B62D 53/062* (2013.01)

(58) Field of Classification Search
CPC .......... B62D 53/062; B60P 1/43; B60P 1/433; B60P 1/436; B60P 3/07
See application file for complete search history.

(56) References Cited

U.S. PATENT DOCUMENTS

| | | | | |
|---|---|---|---|---|
| 3,988,035 A * | 10/1976 | Corompt | ............... | B60P 1/6463 298/12 |
| 4,015,879 A * | 4/1977 | Shonkwiler | ............... | B60P 1/30 298/14 |
| 4,061,390 A * | 12/1977 | Schall | ............... | B60P 3/08 410/26 |
| 4,221,422 A * | 9/1980 | Harold | ............... | B60P 3/08 410/24.1 |
| 4,318,658 A * | 3/1982 | McIntyre | ............... | B60P 3/07 298/17 R |
| 4,348,054 A * | 9/1982 | Shonkwiler | ............... | B62D 53/062 298/11 |
| 4,369,008 A * | 1/1983 | Cooper | ............... | B60P 3/08 410/24.1 |
| 4,456,420 A * | 6/1984 | Newhard | ............... | B60P 3/125 293/118 |
| 4,673,328 A * | 6/1987 | Shiels | ............... | B60P 1/025 254/10 R |
| 4,750,856 A * | 6/1988 | Lapiolahti | ............... | B60P 3/07 280/402 |
| 4,770,592 A * | 9/1988 | Winter | ............... | B60P 3/122 414/477 |
| 5,051,053 A * | 9/1991 | Groeneweg | ............... | B60P 1/24 298/38 |
| 5,094,583 A * | 3/1992 | Bills, Jr. | ............... | B60P 1/433 298/17 B |
| 5,288,197 A * | 2/1994 | Harris | ............... | B60P 1/025 280/43.24 |

(Continued)

*Primary Examiner* — Kevin Hurley
*Assistant Examiner* — Michael R Stabley

(57) ABSTRACT

Riser apparatuses and systems for vehicle transportation are disclosed. Embodiments include a riser with a top surface configured to receive a vehicle. The riser has a front end and a back end opposite the front end. The apparatus is configured such that rotating a lift mechanism causes a front end of the riser to move both in a first horizontal direction and in a first vertical direction to a first raised position such that the front end of the riser is supported by at least one rotatable leg. Rotating the lift mechanism also causes a back end of the riser to move in the first horizontal direction, and causes a latch to engage a carrier rod to secure the riser in the first raised position.

18 Claims, 8 Drawing Sheets

(56) References Cited

U.S. PATENT DOCUMENTS

| | | | | |
|---|---|---|---|---|
| 5,332,345 A * | 7/1994 | Lillard | B60P 3/08 | 410/26 |
| 5,490,754 A * | 2/1996 | Voelzke | B60P 1/433 | 14/71.7 |
| 5,667,231 A * | 9/1997 | Dierks | B60P 1/027 | 280/149.2 |
| 5,676,507 A * | 10/1997 | Lugo | B60P 3/08 | 410/24 |
| 5,755,540 A * | 5/1998 | Bushnell | B60P 3/08 | 410/26 |
| 5,984,614 A * | 11/1999 | Weber | B60P 3/125 | 280/402 |
| 6,241,450 B1 * | 6/2001 | Gehman | B60P 3/07 | 414/469 |
| 6,447,226 B1 * | 9/2002 | Andre | B60P 1/43 | 410/24 |
| 6,450,742 B1 * | 9/2002 | Jenkins | B60P 3/08 | 410/24 |
| 6,497,541 B2 * | 12/2002 | Pawluk | B60P 3/08 | 410/26 |
| 7,063,494 B2 * | 6/2006 | Smith, Jr. | B60P 1/431 | 414/401 |
| 7,547,178 B1 * | 6/2009 | Dierks | B60P 1/43 | 414/484 |
| 7,658,587 B1 * | 2/2010 | Dierks | B60P 1/43 | 280/790 |
| 7,997,850 B2 * | 8/2011 | Hutchison | B60P 3/122 | 414/478 |
| 9,656,588 B2 * | 5/2017 | Robertson | B60P 1/433 | |
| 2006/0083597 A1 * | 4/2006 | Chang | B60P 3/08 | 410/24 |
| 2007/0059118 A1 * | 3/2007 | Chang | B60P 3/08 | 410/24 |
| 2008/0231016 A1 * | 9/2008 | Wall | B60P 3/06 | 280/405.1 |
| 2009/0110523 A1 * | 4/2009 | Geoffrion | B60P 3/06 | 414/480 |
| 2013/0064632 A1 * | 3/2013 | Pawluk | B60P 3/08 | 414/482 |
| 2015/0343937 A1 * | 12/2015 | Nespor | B60P 3/07 | 414/469 |
| 2016/0096464 A1 * | 4/2016 | Robertson | B60P 3/06 | 414/480 |

* cited by examiner

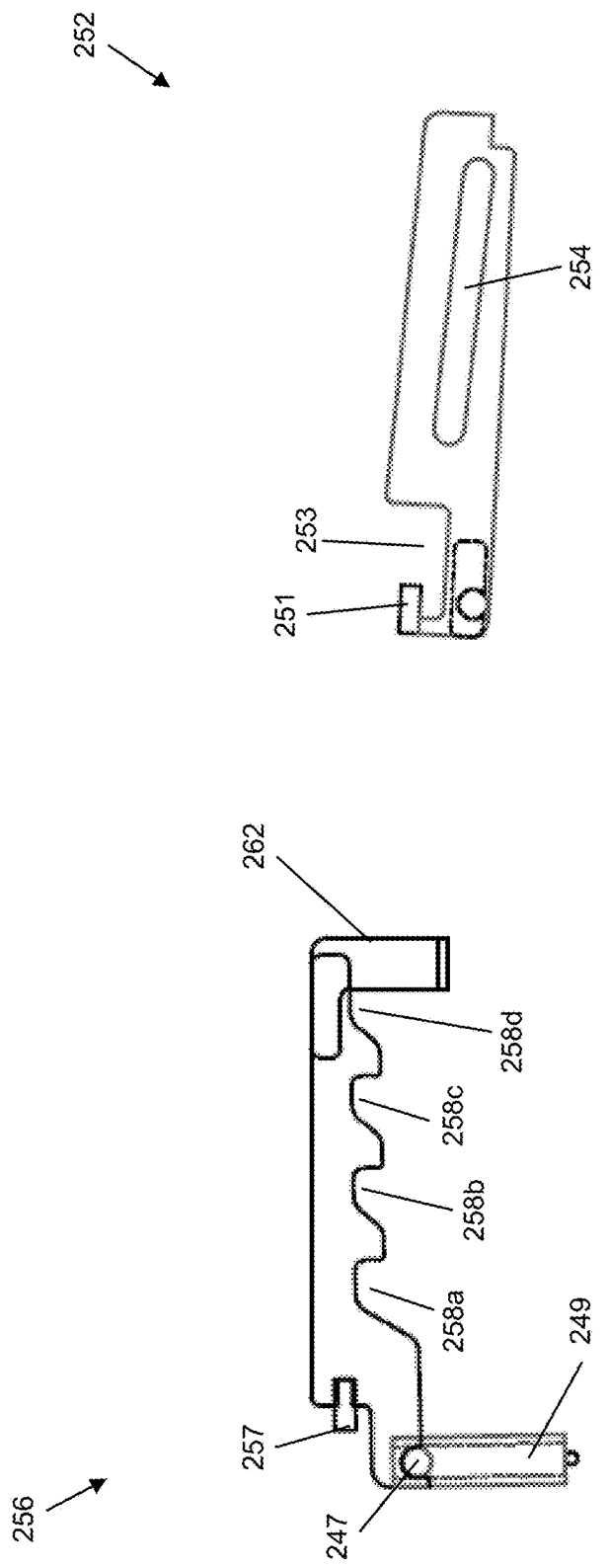

RISER APPARATUS AND SYSTEM FOR VEHICLE TRANSPORT

DESCRIPTION OF THE RELATED ART

The present invention relates generally to transporting vehicles, and more particularly to an improved riser apparatus and system for allowing cars to enter, exit, and transition through vehicle transport trailers and/or other vehicle transport systems. As is understood in art, vehicles such as automobiles, sport utility vehicles ("SUV"), etc. can be transported via transport trailers ("trailer") that are specifically designed to transport vehicles. Multiple vehicles can be transported on such a trailer. It is also known to implement multiple levels or tiers on such trailers to maximize the number of vehicles transported. For example, many trailers implement upper platforms and lower platforms such that two levels of vehicles may be transported at the same time. Each vehicle is secured to the trailer in some fashion, such that each vehicle will be restrained to one of the upper level or platform, or the lower level or platform, such as by straps or chains.

Generally, vehicles on the lower platform of the trailer are loaded after the vehicles on the upper platform have been loaded and secured and after the upper platform has been placed in a raised position. In order to load vehicles onto the lower platform(s) of the trailer, a movable riser or adjustable ramp may be used. The riser allows for vehicles to be driven onto the lower platform, including over the rear wheels of the trailer, when the upper platform in is a raised position. The riser may then be lowered and serve as a portion of the lower platform, allowing another vehicle to be driven onto the riser and secured to the rear end (the end of the trailer farthest from the truck pulling the trailer) of the lower platform formed in part by the riser.

Typical risers only move in a single dimension (i.e. up and down). These risers require manually lifting the riser straight upwards up and securing it into place, such as by retracting legs. Examples of such risers include a riser attached via a fixed hinge to allow the riser to pivot up and down. Such risers may be secured in place by one or more legs either attached to and descending from the riser, or attached to and rising upwards from a base to which the riser is attached. Prior risers also include a securing mechanism to hold the riser in place once raised. However these securing mechanisms are operated separately from the legs supporting the riser. These prior risers can be cumbersome to operate, requiring for instance holding the riser up in place while attempting to guide the retractable legs into place in order to place the riser in a raised position. Similarly, these risers may require releasing the securing mechanism with one hand while moving the legs out of the way with another hand in order to place the riser in a lowered position.

An issue with previous risers is the desire for a smooth transition of vehicles entering the platform, and transitioning from one portion of a platform to another portion of the platform, especially with modern vehicles that may be low to the ground. To address this issue, previous risers have included a removable (or folding) bridge piece to bridge the gap between the end of the riser and the housing or wheel well over the rear wheel of the trailer that may begin a second portion of the lower platform. These bridge pieces add to the weight and complexity of the riser, increase the difficulty to use, and may not provide the desired smooth transition of a vehicle from one portion of the platform to another portion of the platform. Other solutions have implemented hydraulics to lift and secure the riser, but such solutions are expensive and can also require multiple trips back and forth between the riser and the hydraulic controls during operation. Accordingly, what is needed is an improved riser that overcomes the shortcomings of the previous implementations.

SUMMARY OF THE DISCLOSURE

Improved riser apparatuses and systems for vehicle transportation are disclosed. In an embodiment an apparatus for use with a vehicle transport trailer or truck includes a riser with a top surface configured to receive a vehicle driven onto the riser. The riser also has a front end and a back end opposite the front end. The apparatus includes at least one leg, where a first end of at least one leg is rotatably attached to the riser near the front end of the riser. A rotating member is attached to the second end of at least one leg. The apparatus includes a lift mechanism attached to the rotating member, the lift mechanism configured to cause the rotating member to rotate.

The apparatus further includes a carrier rod attached to the bottom surface of the riser near the back end of the riser. Finally, the apparatus includes a latch configured to engage an end of the carrier rod to secure the riser in a first raised position and a second lowered position. The latch has a release mechanism configured to cause a portion of the latch to rotate. The apparatus is configured such that rotating the lift mechanism: causes the front end of the riser to move both in a first horizontal direction and in a first vertical direction to the first raised position such that the front end of the riser is supported by the at least one leg; causes the back end of the riser to move in the first horizontal direction; and causes the latch to engage the carrier rod to secure the riser in the first raised position.

Other systems, apparatuses, and/or methods of using the same will be or become apparent to one with skill in the art upon review of the following drawings and detailed description. It is intended that all such additional systems, apparatuses, and/or methods of using the same be included within this description, be within the scope of the exemplary embodiments, and be protected by the accompanying claims.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 5A illustrates a side view of a component of the latching mechanism illustrated in FIGS. 4A-4C;

FIG. 5B illustrates a side view of another component of the latching mechanism illustrated in FIGS. 4A-4C.

DETAILED DESCRIPTION

The word "exemplary" is used herein to mean "serving as an example, instance, or illustration." Any aspect described herein as "exemplary" is not necessarily to be construed as preferred or advantageous over other aspects.

Figure 1:
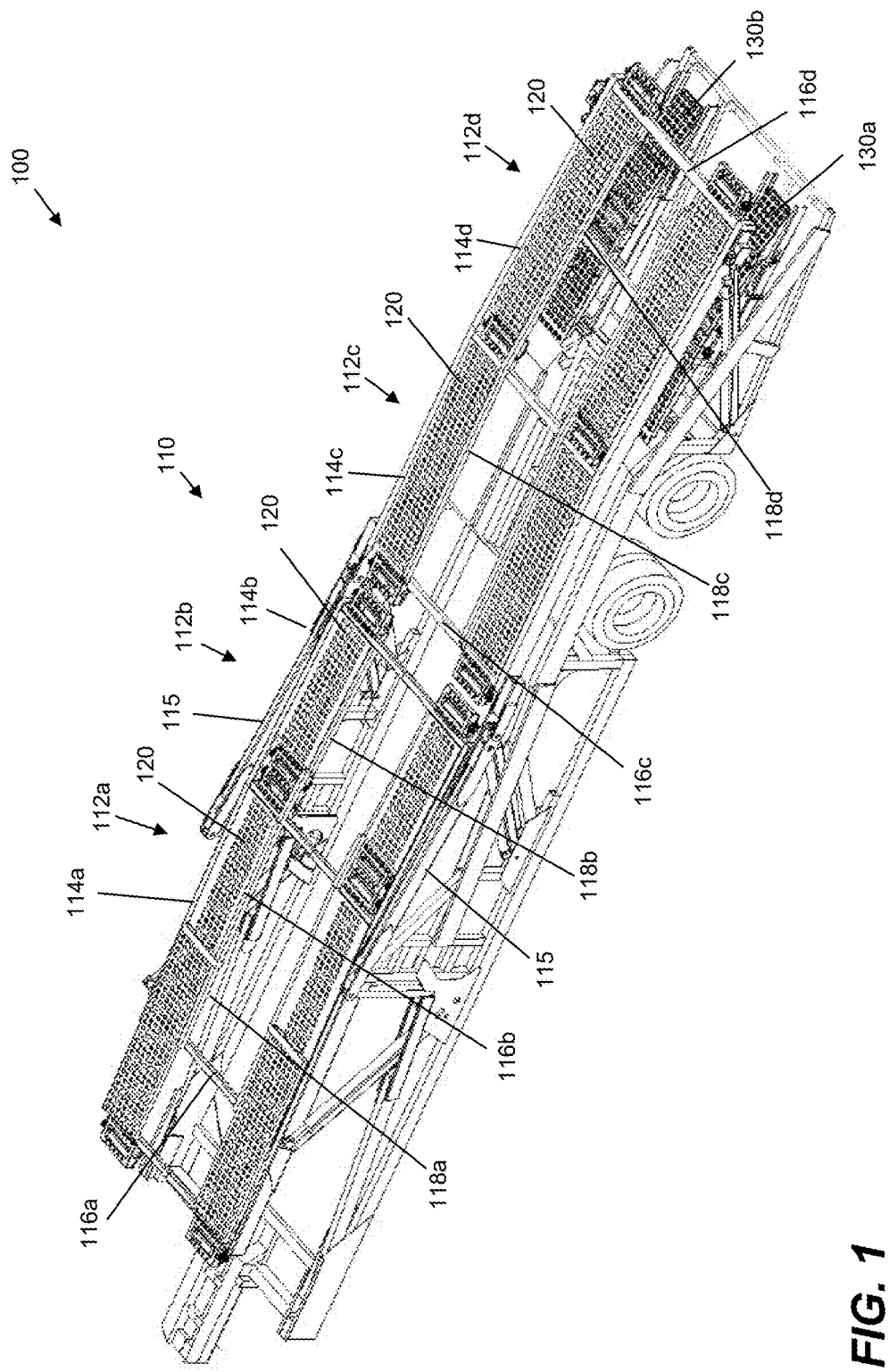
FIG. 1 illustrates a perspective view of a vehicle trailer with which the disclosed improved riser apparatus and system may be implemented.

Exemplary embodiments include an improved riser apparatus and system that may be used to transport vehicles such as automobiles, sport utility vehicles ("SUV"), etc. Although discussed below with respect to vehicle transport trailers ("trailer") designed to be attached to/decoupled from a truck, the embodiments and inventions disclosed herein are equally applicable to other vehicle transport systems such as for example, a truck with permanently attached vehicle transporting systems, tow trucks, etc. An exemplary vehicle transport trailer 100 with which embodiments of the improved riser apparatus and system for trailers may be used is illustrated in FIG. 1. FIG. 1 shows a multi-level vehicle transport trailer 100 in a collapsed configuration. The trailer 100 includes an upper platform 110 for transporting vehicles, the upper platform 110 including multiple portions or sections 112a-112d. Each section 112a-112d comprises an outer frame formed by parallel side rails 114a-114d and end rails 116a-116d connecting the side rails 114a-114d. Inner walls 118a-118d are provided parallel to the side rails 114a-114d of each upper section 112a-112d, with decking 120 between the side rails 114a-114d and inner walls 118a-118d. The side rails, 114a-114d, inner walls 118a-118d, and decking 120 are sized and spaced so that vehicles may be driven onto, and secured to, the upper platform 110 with the cars left and right tires on the decking 120. The decking 120 typically includes a plurality of holes and/or grating, and the decking 120 may include roughened portions on the upper surface to allow vehicle tires to better grip the decking 120 when the vehicles are secured to the upper platform 110.

Figure 2:
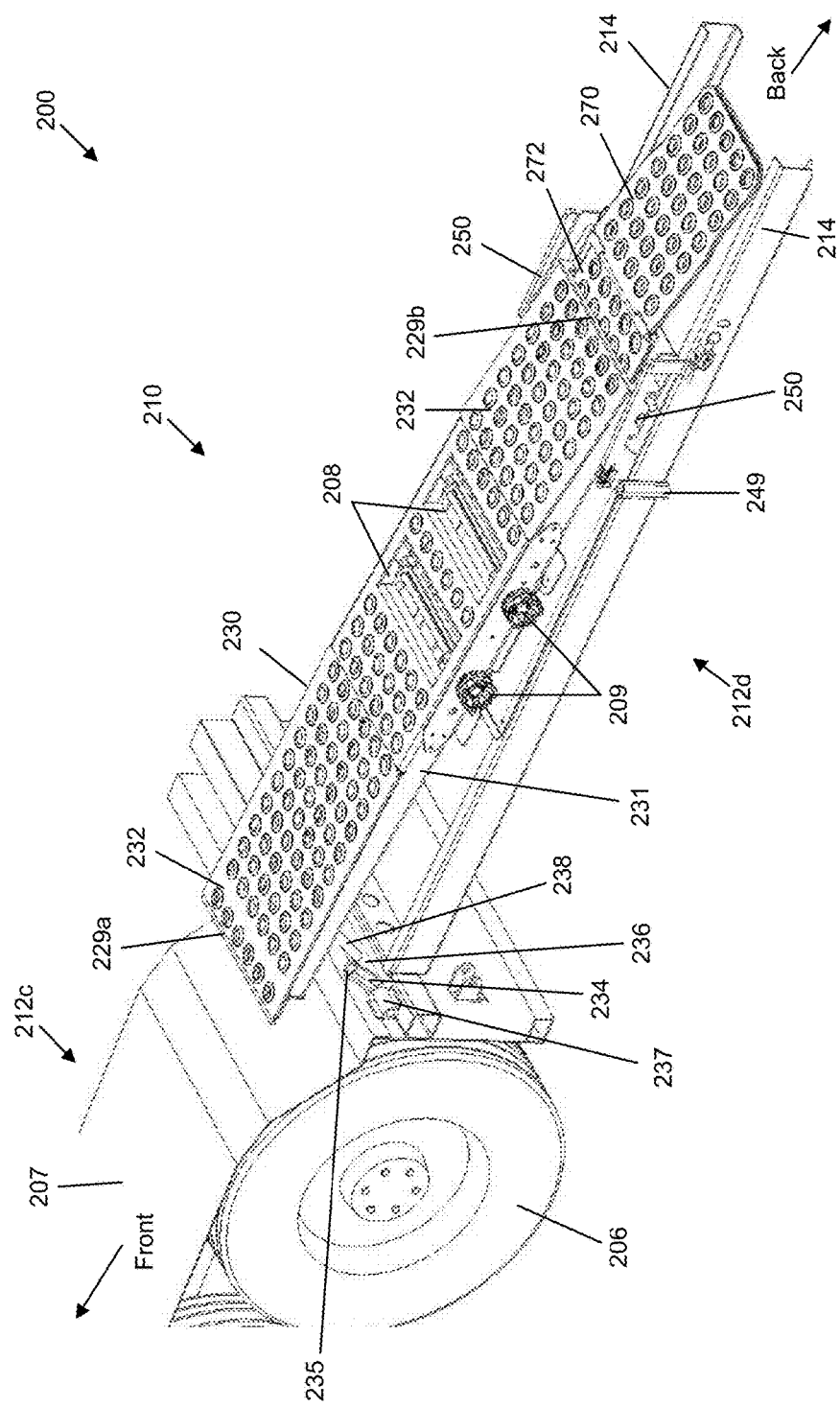
FIG. 2 illustrates a perspective view of an embodiment of an improved riser system and apparatus that may be implemented on a vehicle transport trailer.

The trailer 100 also includes a lower platform 130 similar to the upper platform 110 described above, the lower platform 130 may comprise multiple portions or sections 130a/130b as described above. When the trailer 100 is in a first, collapsed position as illustrated in FIG. 1, the upper platform 110 covers or hides the lower platform 130a/130b, such as to allow vehicles to be loaded onto or off of the upper platform 110 or to secure the trailer 100 when being transported without any vehicles. When the trailer 100 is in a second, extended position (not illustrated), the upper platform 110 is separated from the lower platform, such as to allow vehicles to be loaded onto or off of the lower platform 130a/130b and/or to transport the trailer 100 when loaded with vehicles. As will be understood, various additional support or bracing members such as support 115 and a hydraulic, pneumatic, or other system may be included in the trailer 100 to allow the upper platform 110 to be extended away from and/or collapsed towards the lower platform 130a/130b, as well as to support the upper platform 110 when in an extended position and loaded with vehicles FIG. 2 shows a perspective view of an embodiment of an improved riser that may be implemented on a vehicle transport trailer. In the FIG. 2, only a portion of a transport trailer 200 is illustrated for clarity. It will be understood that trailer 200 illustrated in FIG. 2 may be a portion of trailer 100 illustrated in FIG. 1. In the embodiment of FIG. 2, a part of a left center section 212c and a left rear section 212d of a lower platform 210 of trailer 200 is illustrated. The left center section 212c begins approximately over left rear wheel 206 and extends forward towards a "front" end of the trailer 200 (labeled as "Front" in FIG. 2) that may be attached to a tractor or truck (not shown) that tows the trailer 200. The left rear section 212d begins approximately behind the left rear wheel 206 and extends towards a "back" end of the trailer 200 (labeled as "Back" in FIG. 2).

Throughout this disclosure, "front" or "forward" will correspond with the end of the trailer 200 or direction labeled "Front" in FIG. 2. Similarly, "back" or "backward" will correspond with the end of the trailer 200 or direction labeled "Back" in FIG. 2. As will also be understood (and as illustrated in FIG. 1) trailer 200 will also include a corresponding right center section 212c and right rear section 212d of the lower platform 210 which is not separately shown for clarity. In an embodiment, this right portion of the lower platform 210 will contain the same features illustrated in FIG. 2 and discussed below to allow loading and carrying of vehicles on trailer 200.

As illustrated in FIG. 2, the left rear section 212d of the lower platform 210 comprises a movable riser 230 disposed between two parallel side rails 214 running the length of rear section 212d. Riser 230 may be made of metal or any other appropriate material. Riser 230 may comprise a front end 229a (the end closest to the "Front" of trailer 200) and a back end 229b (the end closest to the "Back" of trailer 200). Riser 230 may include decking 232 supported by two parallel side walls 231 extending downwards from the underside of decking 232. Decking 232 and side walls 231 may be formed from a single piece, such as by folding the edges of the decking 232 to form side walls 231. In other embodiments, the rise 230 may comprise a single piece decking 232 affixed to the side walls 231, or may in some embodiments may comprise separate sections or pieces of decking 232 affixed to the side walls 231 to form riser 230. Riser 230 is configured to allow movement between a lowered position that is substantially parallel to side rails 214 (see FIG. 3A) and a raised position illustrated in FIG. 2 and FIG. 3B. In an embodiment, the front end 229a of riser 230 may extend beyond the ends of side walls 231 to form a lip to support riser 230 when riser 230 is in a lowered position as discussed below. In some embodiments riser 230 is also configured to move to additional intermediate positions between the lowered position and raised position as also discussed below.

As will be discussed more fully below, one aspect of riser 230 is the ability to move in two directions at the same time. When raising from the lowered position to the raised position illustrated in FIG. 2, riser 230 moves both vertically (upwards from the trailer base) and horizontally (forward towards the front of the trailer). Similarly, when lowered riser 230 moves both vertically (downwards towards the trailer base) and horizontally (backwards towards the rear of the trailer). This upward and forward movement when riser 230 is raised serves to bridge the gap between riser 230 and the top of wheel housing 207, allowing vehicles a smooth transition between riser 230 and other portions of the lower platform. Similarly, the downwards and rearward movement when riser 230 is lowered serves to create space between riser 230 and wheel housing 207, allowing easier storage of vehicles on riser 230. Importantly, riser 230 provides vehicles a smooth transition onto/off of riser 230 without the need for an extended wheel housing 207 or a flap piece found in prior systems. Avoiding an extended wheel housing 207 and/or allowing for a rounded wheel housing 207 (see FIG. 3A-3B) or an angled wheel housing 207 (see FIG. 2) can be particularly advantageous since extended wheel housings 207 can interfere with storing vehicles on the rear portion of the lower platform 210.

In operation, riser 230 allows vehicles to be driven onto trailer 200, driven off of trailer 200, and to be stored on trailer 200 for transport. To assist with these functions, decking 232 may be made of metal or any other appropriate material and may include a plurality of holes, grating, and/or roughened portions on the upper surface to allow vehicle tires to better grip the decking 232 when the vehicles are driven on and/or secured to the lower platform 210. For example, in the illustrated embodiment, decking 232 may include a plurality of openings 208 to allow straps or chains to secure a vehicle to lower platform 210, such as tie down ratchets 209 extending through one or more side walls 231 of riser 230.

In the raised position illustrated in FIG. 2, riser 230 allows vehicles to be driven onto (and off of) the lower platform 210 of trailer 200, including up to (and down from) center section 212c over rear wheel 206. When in the raised position, the front end 229a of the riser 230 is proximate to the center section 212c of lower platform 210 to allow vehicles to be driven on riser 230 to the center section 212c of lower platform 210 (or down from center section 212c) without the need for any additional bridge or portion between the riser 230 and the center section 212c.

To further assist with getting vehicles onto or off of the lower platform 210, an additional ramp 270 and/or rear bridge portion 272 may be implemented to allow vehicles onto (or off of) the back end 229b of riser 230 more easily. Ramp 270 may be movable so that it is only in position when needed to load or remove vehicles from the lower platform 210 of trailer 200, such as by hinging one end of ramp 270 as illustrated in FIG. 2 to allow ramp 270 be folded up and out of the way when not needed. Bridge portion 272 may be similarly movable, or may be affixed to the side rails 214 and may be immovable in some embodiments. In such embodiments where bridge portion 272 is not movable, bridge portion 272 may be exposed when the riser 230 is in the raised/forward position (see FIGS. 2, 3B, and 4B) and bridge portion 272 may be covered by the riser 230 when the riser 230 is in a lowered/back position (see FIGS. 2A and 4A).

In the raised position shown in FIG. 2, the front end 229a of riser 230 is supported by one or more legs 238. In an embodiment, there are at least two legs 238, one on each side of riser 230 to ensure that riser 230 is adequately supported and to ensure that riser 230 does not twist or move from side to side when the riser 230 is raised or lowered. The legs 238 may be affixed at a first end to one of the side walls 231 of riser 230 or to the underside of decking 232. The other/second ends of the legs 238 are attached to a rotating member 236.

In an embodiment, rotating member 236 may be a rotating bar held in place at either end by a bracket 237 that allows the bar to rotate or spin in place. As illustrated in FIG. 2, a metal lift mechanism 234 may also be affixed to the rotating member 236. In an embodiment, the lift mechanism 234 may comprise a tube with an open end 235 of the tube/mechanism 234 extending away from the rotating member 236. The lift mechanism 234 may be sized and configured so that the open end 235 opposite the rotating member 236 can receive a bar, such as a lever or bar used to operate tie down ratchets 209. As discussed below, riser 230 may be easily lifted from the lowered position (see FIG. 3A) to the raised position illustrated in FIG. 3 by inserted the bar/lever into the open end 235 of lift mechanism 234 and pushing/pulling the bar in a forward direction (toward the "Front" of trailer 200). In another embodiment, instead of a tube, lift mechanism 234 may comprise a permanently affixed handle that may be pushed/pulled in the forward direction.

When riser 230 is in a desired position, riser 230 may be held in place by a latch 250 mechanism. In some embodiments latch 250 is configured to allow riser 230 to move between a lowered position (see FIG. 3A) and a raised position (see FIGS. 2 and 3B) and to secure the riser 230 in the lowered position and/or in the raised position. In other embodiments, latch 250 is configured to secure riser 230 at additional intermediate positions between the lowered position and the raised position. Latch 250 may also be coupled to a release mechanism 249. In an embodiment, the release mechanism 249 may be sized and dimensioned similar to the lift mechanism 234 to receive a bar (such as a lever or bar used to operate tie down ratchets 209). As discussed below, riser 230 may be easily lowered from the raised position illustrated in FIG. 2 to a lowered position (see FIG. 3A) by inserted the bar/lever into the release mechanism 249 and pushing/pulling the bar forwards (towards to the "Front" of trailer 200) to release the latch 250, allowing gravity to move riser 230 to the lowered position. In other embodiments where lift mechanism 234 is a permanently affixed handle, the handle may be similarly pushed/pulled in the forward direction to release latch 250.

Figure 3A:
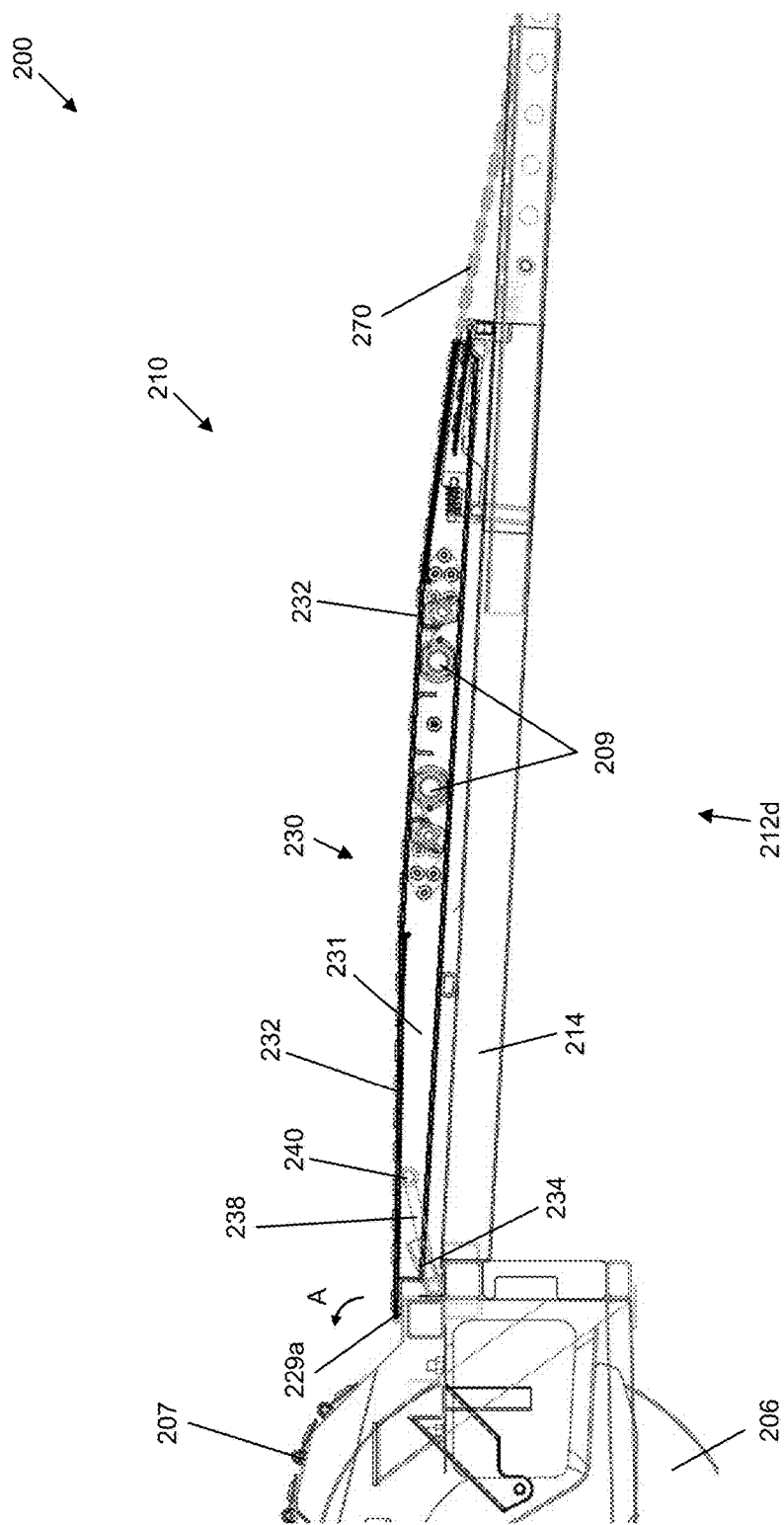
FIG. 3A illustrates a side view of aspects of the embodiment of the improved riser system of FIG. 2, with the riser system in a lowered position.
Figure 3B:
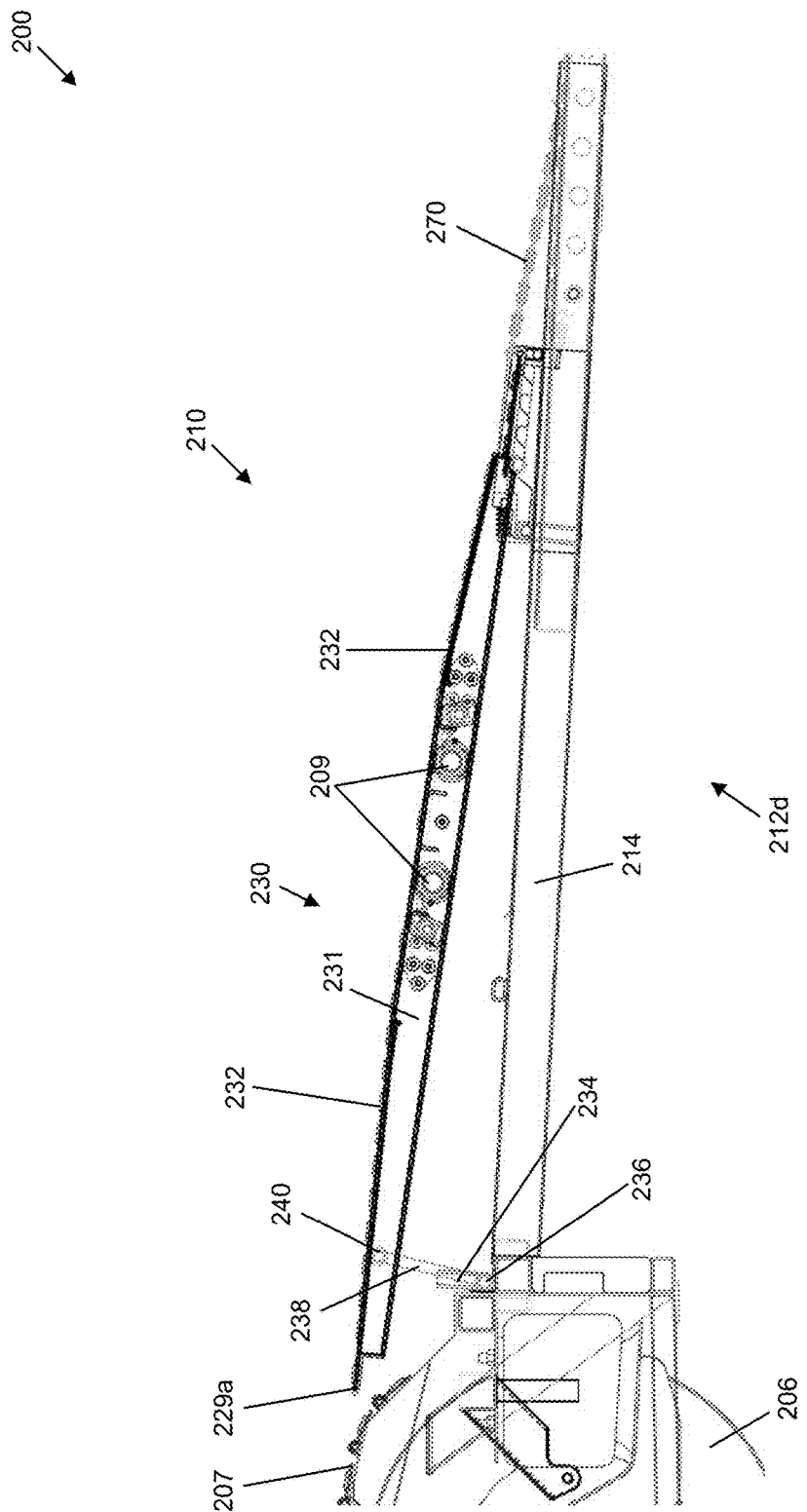
FIG. 3B illustrates a side view of aspects of the embodiment of the improved riser system of FIG. 2, with the riser system is in a raised position.

Turning to FIGS. 3A-3B, side views of aspects of the embodiment of the trailer 200 of FIG. 2 are illustrated. In FIG. 3A the riser 230 is in the lowered position, while in FIG. 3B the riser 230 is in the raised position. As discussed, in the raised position of FIG. 3B riser 230 is supported by a one or more legs 238, where one end of each leg 238 is coupled to a rotating member 236 (see FIG. 2 and FIG. 3B).

In the lowered position of FIG. 3A, the riser 230 may not supported at the front by the plurality of legs 238. Instead, the front portion of riser 230 may be supported in the lowered position by the front end 229a of riser 230 resting on a portion of wheel housing 207 in an embodiment, while the rear portion of riser 230 may be supported in the lowered position by pin 255 engaged in slot 254 as described below. In another embodiment, some portion of the riser 230 may instead, or also, be supported by underlying structure of the trailer 200. As also shown by FIG. 3A, the ends of the one or more legs 238 opposite the rotating member 236 may be connected to riser 230 through a coupler 240 attached to the end of each leg 238. Coupler 240 is configured such that when the riser 230 is lowered the leg(s) 238 rotate down and rearwards, allowing the riser 230 to move backwards (towards the "Back" of trailer 200) and downwards to lie relatively flat in the lowered position. In an embodiment, coupler may comprise a second rotating bar to which each leg 238 is attached.

Riser 230 may be easily lifted from the lowered position illustrated in FIG. 3A to the raised position illustrated in FIG. 3B (see also FIG. 2) by inserted the bar/lever into the open end 235 (FIG. 2) of lift mechanism 234 and pushing/ pulling the bar towards the "Front" of trailer 200 illustrated as direction "A" in FIG. 3A. This pushing/pulling of the bar in direction "A" causes the rotating member 236 to rotate in the same forward direction "A." This movement of rotating member 236 forward in direction "A" causes the legs 238 to move along with the rotating member 236, which in turn moves the front end 229a of riser 230 in direction "A" both upwards (away from the side rails 214) and forward (towards the "Front" of trailer 200). At the same time, the back end 229b of riser 230 also slides forward. In some embodiments, the back end 229b of riser 230 may also lift upwards (away from side rails 214), but to a lesser amount than the front end 229a of riser 230 lifts away from side rails 214.

Figure 4A:
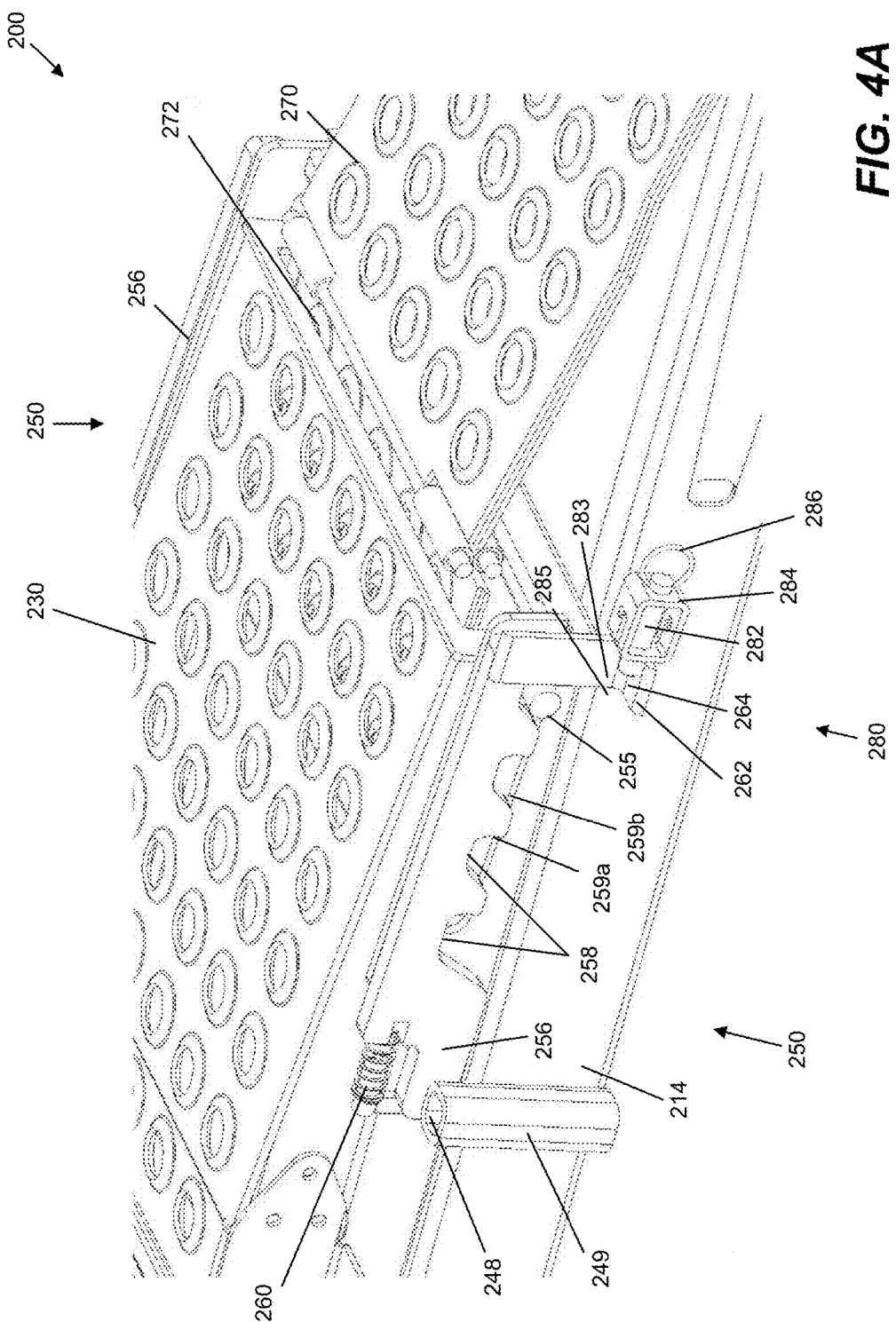
FIG. 4A illustrates a close-up perspective view of aspects of the latching mechanism of the embodiment of the improved riser system of FIG. 2, with the riser system in a lowered position.
Figure 4B:
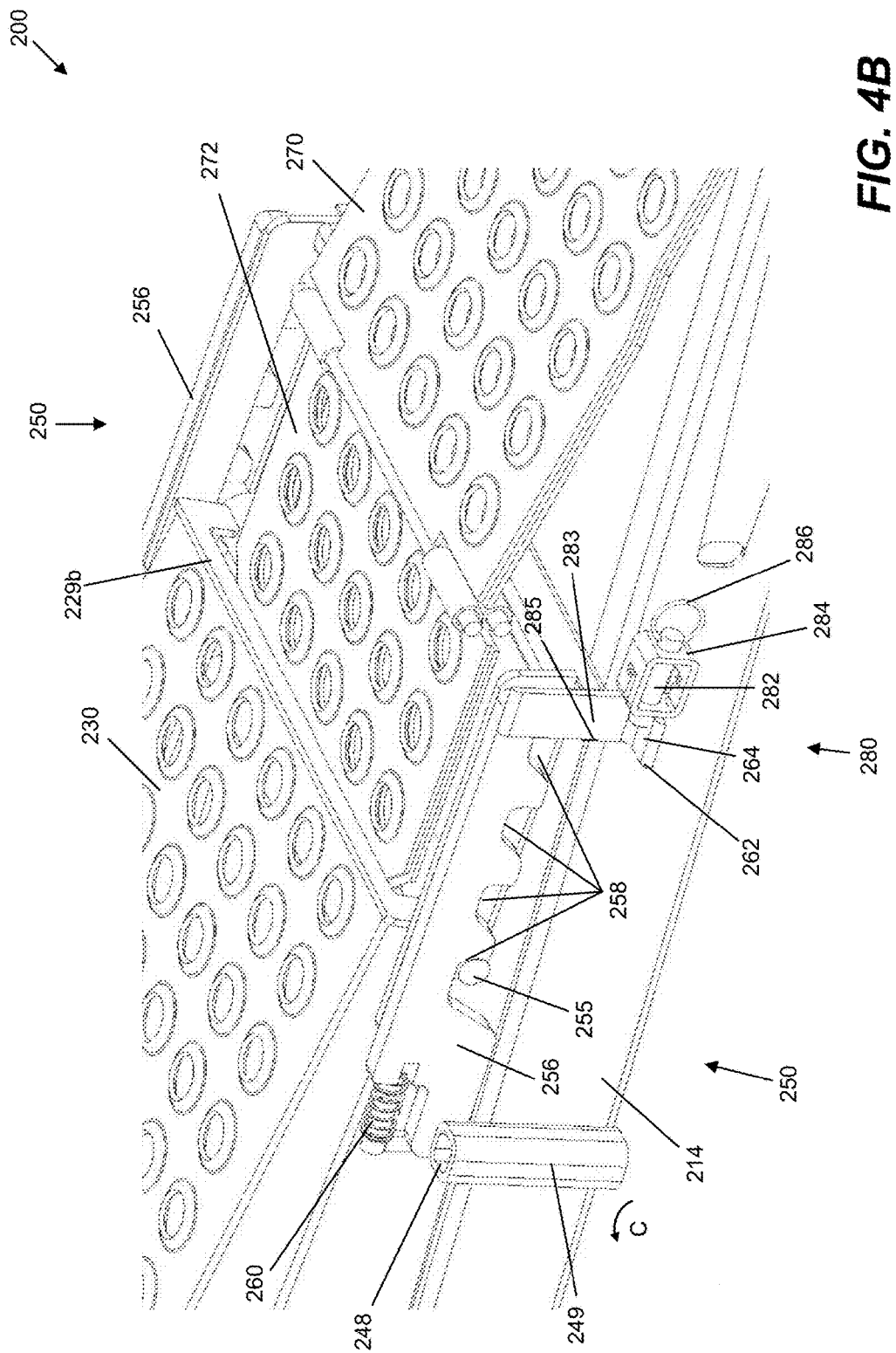
FIG. 4B illustrates a close-up perspective view of aspects of the latching mechanism of the embodiment of the improved riser system of FIG. 2, with the riser system in a raised position.
Figure 4C:
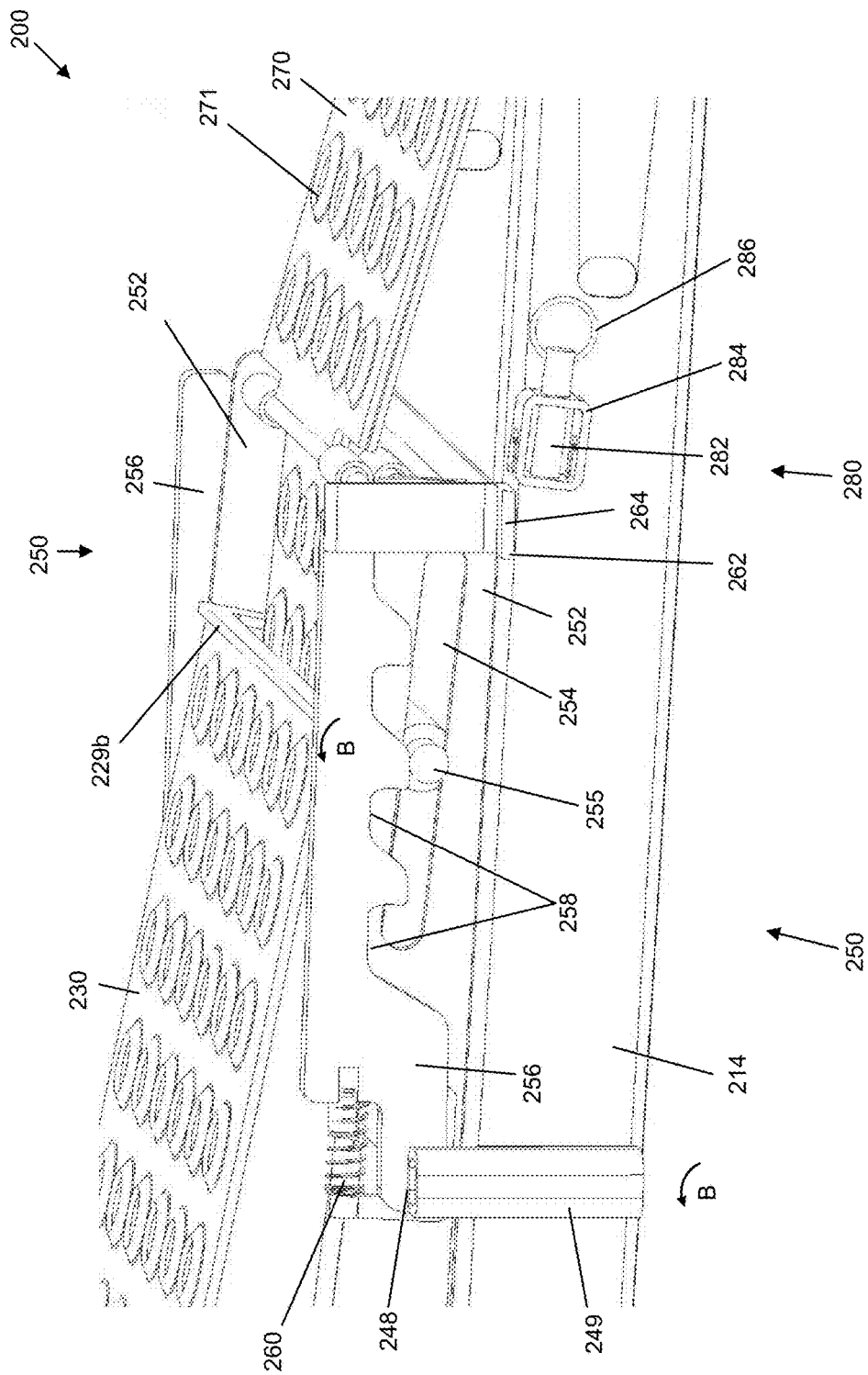
FIG. 4C illustrates close-up perspective view of aspects of the latching mechanism of the embodiment of the improved riser system of FIG. 2, with the riser system moving between positions.

FIGS. 4A-4C show close-up perspective views of a latch mechanism, such as latch 250 of FIG. 2, that may be used with the riser 230 illustrated in FIG. 2 for trailer 200. Beginning with FIG. 4C, where riser 230 is shown moving between positions, an exemplary latch 250 is illustrated. As shown in the embodiment of FIG. 4C, each riser 230 may include two latches 250, with one latch 250 on each side of the riser 230 located near the back end 229b of the riser 230. In the illustrated embodiment, the latches 250 are coupled to allow release of both latches 250 at the same time via release mechanism 249. In other embodiments each riser 230 may only include a single latch 250. Except as discussed below with respect to the locking mechanism 280, each of the two latches 250 for a riser 230 will be the same (i.e. only one of the latches 250 will have the locking mechanism 280). As a result the discussion below (apart from the discussion of the locking mechanism 280) is equally applicable to each latch 250, but for clarity only one latch 250 will be discussed.

In an embodiment, latch 250 may comprise a base 252 portion and a catch 256 portion. Base 252 may be a roughly rectangular, thin component with a bottom edge or side of base 252 attached to and extending upwards from the corresponding side rail 214 of the rear section 212d of lower platform 210 (see FIG. 2). As shown in FIG. 4C a slot 254 is formed in (and through) the base 252. In an embodiment, the slot 254 in the base 252 may be angled such that the front end of the slot 254 (the end closest to the "Front" of trailer 200) is higher than the back end of the slot 254. By angling slot 254 in this manner, gravity causes riser 230 to return to the lowered position when the catch 256 is released as discussed below.

Slot 254 is dimensioned to receive an end of a carrier rod 255 that is affixed to riser 230 such that the carrier rod 255 may move forwards (toward the "Front" of trailer 200) and backwards (towards the "Back" of trailer 200) along the slot 254. In the illustrated embodiment, a single carrier rod 255 extends the width of riser 230 to engage in the slots 254 of the bases 252 located on each side of the riser 230. However, two carrier rods 255 may be used, one carrier rod 255 for each base 252 on either side of riser 230. Regardless of how implemented, carrier rod 255 is dimensioned to extend out of the slot 254 to engage the catch 256 in the embodiment of FIG. 4C.

Note that in the illustrated embodiment, the base 252 of each latch 250 is located between the riser 230 and the catch 256. Different configurations of the latch 250 are possible. For example in another embodiment catch 256 may instead be located between the riser 230 and the base 252. For such embodiments carrier rod 255 would be dimensioned to extend through catch 256 and engage slot 254 of base 252.

Catch 256 may be a roughly rectangular, thin component with a series of indentations 258 extending upwards from a bottom edge or side of catch 256, with a protrusion or "tooth" separating each indentation 258 as illustrated in FIG. 4C. In this embodiment, catch 256 is located parallel to the base 252 and a front end of the catch 256 (i.e. the end of the catch 256 closest to the "Front" of trailer 200) is affixed to a rotation point 247 (see FIG. 5A). This configuration allows the catch 256 to rotate upwards (away from side rail 214) shown a direction "B" in FIG. 4C with respect to the base 252 when acted on by carrier rod 255 as discussed below. Undesired rotation of the catch 256 in direction "B" is prevented by gravity. In some embodiments, a biasing spring 260 is coupled to the front side of catch 256 to further prevent undesired rotation of the catch 256 in direction "B," such as when vehicles are being loaded onto or removed from the lower platform 210 of trailer 200.

The bottom edge of the catch 256 rests on, and is supported by, the end of the carrier rod 255 extending from the slot 254 in base 252 that is parallel to the catch 256. Each indentation 258 in catch 256 is dimensioned and configured to receive the end of carrier rod 255, and to secure the end of carrier rod 255. Turning to FIG. 4A, in the illustrated embodiment each protrusion or "tooth" separating the indentations 258 has a front edge 259a (the edge closest to the "Front" of trailer 200) and a back edge 259b. The front edge 259a of each "tooth" is approximately perpendicular to the top edge of the catch 256, while the back edge 259b of each "tooth" is at a non-perpendicular angle relative to the top or top edge of catch 256.

As discussed above for FIGS. 2 and 3A-3B, when the riser 230 moves forward and upwards (towards the "Front" of trailer 200) such as by rotating the lift mechanism 234 forward, the back end 229b of riser 230 also slides forward. The movement of the back end 229b correspondingly causes the attached carrier rod 255 to also travel forward along the slot 254 of base 252 and along the bottom edge of the catch 256. When moving in this forward direction, carrier rod 255 slides along the slope or angle of the back edge 259b of each "tooth" of the catch 256, rotating the catch 256 upwards in direction "B" until the next indentation 258 is reached.

When the riser 230 stops moving (or reaches the front indentation 258), the carrier rod 255 engages with the indentation 258 corresponding to where the riser 230 has stopped. The perpendicular front edge 259a of the "tooth" behind the indentation 258 prevents the carrier rod 255 from moving backwards (towards the "Back" of trailer 200), securing the carrier rod 255, and the riser 230, in place. The biasing spring 260 helps prevent unwanted rotation of the catch 256, further ensuring that the carrier rod 255 and the riser 230 are held in the desired location.

By way of example, FIG. 4B shows the latch 250 when the riser 230 is in a raised position corresponding to FIG. 2 and FIG. 3B. As discussed above, in this raised position, the front end 229a of the riser 230 has been rotated upward and forward (such as by engaging a lever in lift mechanism 234 and rotating lift mechanism 234 forward), causing the back end 229b of the riser 230 to slide forward. As can be seen in FIG. 4B, this movement by the back end 229b of the riser 230 may cause the bridge portion 272 to be revealed in some embodiments.

This motion by the back end 229b of the riser 230 also correspondingly causes the carrier rod 255 to slide forward along the slot 254 of the base 252 until carrier rod 255 engages the first (most forward) indentation 258 of the catch 256. The perpendicular front edge 259a of the "tooth" behind the first indentation 258 prevents the carrier rod 255 from moving backwards, securing the carrier rod 255 in place. Similarly, the biasing spring 260 helps prevent the catch 256 from unwanted rotations in the "B" direction, further securing the carrier rod 255 in place.

As shown in FIG. 4B, an additional locking mechanism 280 may be used to further secure the catch 256 in place once the riser 230 is in the desired position. In the embodiment of FIG. 4B the locking mechanism 280 is only used with one of the latches 250 for riser 230. In other embodiments a locking mechanism 280 may be used for both latches 250 of a riser 230 if desired. Additionally, any desired locking mechanism 280 may be used. FIG. 4B provides an example of a suitable locking mechanism 280 that includes a flange 262 that is formed in or affixed to the back end of the catch 256 (the end of the catch 256 closest to the "Back" of trailer 200). Flange 262 includes a foot 262 extending outwards from the bottom portion of flange 262 perpendicular to the side of the catch 256. The locking mechanism 280 also includes a pin 282 configured to slide into and out of a housing 284.

When the carrier rod 255 is engaged in an indentation 258, like in FIG. 4B, the foot 264 of the flange 262 is positioned such that the pin 282 may slide forward (towards the "Front" of trailer 200) to engage a top surface of foot 264, preventing the catch 256 from rotating upwards. By contrast, when the carrier rod 255 is moving (either forwards or backwards) and the catch 256 is rotated upwards, like in FIG. 4C the pin 282 cannot engage the foot 264 of the flange 262. As a result, the locking mechanism 280 will not cause the carrier rod 255 (and riser 230) to inadvertently stop.

Returning to FIG. 4B the pin 282 may be configured with a means or mechanism to make engaging the pin 282 with flange 262 or disengaging the pin 282 from flange 262 easier, such as for example ring 286. Additionally, the pin 282 may be configured with a means or mechanism to ensure that the pin 282 remains engaged with the flange 262. For example, a spring (not shown) may be implemented, or the pin 282 may have one or more protrusions 283 configured to fit into corresponding channel(s) or detents 285 of the housing 284 as shown in FIG. 4B. The detents 285 of housing 284 may be configured to allow the pin 282 to slide back and forth freely, but to twist and lock the pin 282 in place (either when the pin 282 is engaged with flange 262, when the pin 282 is not engaged with flange 262, or both).

The latch 250 also allows for easy movement of the riser 230 from a raised position to an intermediate position and/or or to a lowered position. For example, as shown in FIG. 4B, the catch 256 may be coupled to a release mechanism 249 with an opening 248 sized and dimensioned similar to the lift mechanism 234 to receive a bar (such as a lever or bar used to operate tie down ratchets 209). Release mechanism 249 is affixed to the catch 256 in a way that allows the release mechanism 249 to rotate with catch 256. For example, a side of release mechanism 249 may be affixed to the same rotation point 247 (see FIG. 5A) about which the catch 256 rotates. In an embodiment, the rotation point 247 may comprise a rotating bar to which both the catch 256 and release mechanism 249 are connected.

Once the locking mechanism 280 is disengaged from the catch 256 (or the flange 262 of the catch 256), a bar/lever may be inserted into the release mechanism 249. Pushing/pulling the bar forwards (towards to the "Front" of trailer 200) causes the release mechanism 249 to rotate in direction "C" illustrated in FIG. 4B. This rotation of release mechanism 249 also causes the catch 256 to rotate upwards, releasing carrier rod 255 from the indentation 258 of catch 256. Once released from the indentation 258, gravity and the weight of riser 230 causes the carrier rod 255 to slide backwards down the angled slot 254 of the base 252, allowing riser 230 to move backwards (towards the "Back" of trailer 200).

If the release mechanism 249 remains rotated in the "C" direction, the carrier rod 255 moves backwards all the way to the end of slot 254 corresponding to the last or most rearward indentation 258 (the indentation 258 closest to the "Back" of trailer 200), resulting in the riser 230 being placed in the lowered position (see FIGS. 3A and 4A). FIG. 4A shows the latch 250 with the riser 230 in the lowered position corresponding to FIG. 2A discussed above. With the riser 230 in the lowered position, the carrier rod 255 is engaged in the last or most rearward indentation 258 (the indentation closest to the "Back" of trailer 200) of the catch 256. As will be understood, the locking mechanism can 280 may be engaged with the riser 230 in the lowered position further secure the carrier rod 255 (and the riser 230) if desired.

If an intermediate position is desired, the release mechanism 249 may be released or rotated backward (opposite of direction "C") at the desired point. In that event, the carrier rod 255 will engage with the indentation 258 at the point the release mechanism 249 was released, securing the riser 230 in the corresponding intermediate position. Alternatively, if the carrier rod 255 is in the last indentation 258 corresponding to a lowered position for the riser 230, the lever or bar may be moved to the lift mechanism 234 which may be rotated forward to move the carrier rod 255 (and the riser 230) to the desired intermediate position. In either event, the locking mechanism 280 may then be engaged if desired to further secure the carrier rod 255 (and the riser 230) in the intermediate position.

FIGS. 5A-5B are side views showing aspects of an exemplary catch 256 (FIG. 5A) and base 252 (FIG. 5B) that may be used in the latch 250 discussed for FIGS. 2, 3A-3B, and/or 4A-4C. As illustrated in FIG. 5A the catch 256 includes four indentations 258a-258d. These four indentations 258a-258d correspond to a raised position (the first or indentation 258a closest to the "Front" of trailer 200), a lowered position (the last or indentation 258d closest to the "Back" of trailer 200), and two desired intermediate positions between raised and lowered (258b-258c). As will be understood in different embodiments the catch 256 may contain more or fewer indentations 258.

As will also be understood, the catch 256 may be configured differently than illustrated in FIG. 5A (and FIGS. 4A-4C). For example, instead of having indentations 258a-258d formed in the bottom surface or edge of catch 256 and the bottom of catch 256 resting on carrier rod 255 as illustrated, the indentations 258a-258d may be formed in the upper surface or edge of catch 256 (not illustrated). For such embodiments, carrier rod 255 may rest on the upper surface or edge of catch 256. Additionally, for such embodiments, releasing catch 256 may comprise turning release mechanism 249 in a direction opposite of Direction "B" (FIG. 4C) in order to lower catch 256 and disengage carrier rod 255 from one of indentations 258a-258d.

FIG. 5A also shows the rotation point 247 to which catch 256 and release mechanism 249 may be affixed in an embodiment, and about which catch 256 and release mechanism 249 may rotate. In embodiments such as FIGS. 4A-4C, where two latches 250 are implemented for a riser 230, the catch 256 of each of the two latches 250 is coupled to rotation point 247. In this manner, activation of release mechanism 249 serves to rotate/release the catch 256 of both latches 250. Catch 256 may also include a protrusion 257 extending outwards from a front edge or side (the edge or side closest to the "Front" of trailer 200). Protrusion 257 is located and dimensioned to hold a first end of biasing spring 260 (see FIGS. 4A-4C) and to secure biasing spring 260 against catch 256.

As shown in FIG. 5B the base 252 may be a separate component of the latch 250. In other embodiments, the catch 256 and the base 252 may be parts of a single component forming the latch 256. Base 252 may also include a rearward facing protrusion 251, such as protrusion 251 formed in a cut-out 253 extending downwards from an upper edge or side of base 252. This rearward facing protrusion 251 that is located towards the front edge or side of base 252 is located and dimensioned to hold the second end of biasing spring 260 (see FIGS. 4A-4C) and to help secure biasing spring 260 against catch 256.

While the invention has been described with reference to exemplary embodiments, it will be understood by those skilled in the art that various changes may be made and equivalents may be substituted for elements thereof without departing from the scope of the invention, including the alternate embodiments discussed above. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc. are used to distinguish one element from another. Furthermore, the use of the terms a, an, etc., do not denote a limitation of quantity, but rather denote the presence of at least one of the referenced item. Similarly, use of the terms set, plurality, etc., also do not denote a limitation of quantity, but rather denote the presence of at least two of the reference item.

What is claimed is:

1. An apparatus for use with a vehicle transport truck or trailer, the apparatus comprising:
    a riser with a top surface configured to receive a vehicle driven onto the riser, the riser including a front end and a back end opposite the front end;
    at least one leg, a first end of the leg rotatably attached to the riser near the front end of the riser;
    a rotating member attached to the second end of the at least one leg;
    a lift mechanism attached to the rotating member, the lift mechanism configured to cause the rotating member to rotate;
    a carrier rod coupled to the riser near the back end of the riser; and
    a latch configured to engage an end of the carrier rod to secure the riser in a first raised position and a second lowered position, the latch including a release mechanism configured to cause a portion of the latch to rotate, wherein rotating the lift mechanism:
        causes the front end of the riser to move both in a first generally horizontal direction and a first generally vertical direction to the first raised position such that the front end of the riser is supported by the at least one leg,
        causes the back end of the riser to move in the first generally horizontal direction, and
        causes the latch to engage the carrier rod to secure the riser in the first raised position, and
    wherein rotating the release mechanism in the first direction:
        causes the latch to release the carrier rod,
        causes the front end of the riser to move in a second generally horizontal direction opposite the first horizontal direction and in a second generally vertical direction opposite to the first vertical direction to the second lowered position, and
        causes the back end of the riser to move in the second generally horizontal direction.

2. The apparatus of claim 1, wherein once the riser is in the second lowered position the latch engages the carrier rod to secure the riser in the second lowered position.

3. The apparatus of claim 1, wherein the latch further comprises:
    a base portion with a slot formed through the base portion, the slot configured to receive an end of the carrier rod such that the end of the carrier rod may travel in the slot; and
    a rotatable catch portion coupled to the release mechanism, an edge of the catch in contact with the end of the carrier rod protruding from the slot of the base portion, wherein at least two indentations configured to receive the end of the carrier rod are formed in the edge of the catch, each of the at least two indentations separated by a protrusion configured to allow movement of the carrier rod in the first direction but prevent movement of the carrier rod in the second direction.

4. The apparatus of claim 3, wherein a first indentation in the catch is located such that when carrier rod is received in the first indentation the riser is secured in the first raised position and a second indentation in the catch is located such that when the carrier rod is received in the second indentation the riser is secured in the second lowered position.

5. The apparatus of claim 4, wherein a third indentation in the catch is located such that when the carrier rod is received in the third indentation the riser is secured in a third intermediate position between the first raised position and the second lowered position.

6. The apparatus of claim 5, wherein the riser may be placed in the third intermediate position by using the lift mechanism to lift the riser from the second lowered position to the third intermediate position or by using the release mechanism to lower the riser from the first raised position to the third intermediate position.

7. The apparatus of claim 3, wherein the latch further comprises a locking mechanism configured to prevent the catch from rotating when the carrier rod is received by one of the at least two indentations.

8. The apparatus of claim 7, wherein the locking mechanism comprises:
    a foot extending outwards from a side of the catch; and
    a pin configured to engage the foot when the carrier rod is received by one of the at least two indentations.

9. The apparatus of claim 1, wherein the latch is affixed to a first side of the riser, the riser system further comprising:
    a second latch affixed to the second side of the riser, the second latch configured to engage a second end of the carrier rod to secure the riser in a first raised position and a second lowered position, the second latch coupled to the release mechanism in a manner to allow a portion of the second latch to rotate, and
    wherein rotating the lift mechanism further causes the second latch to engage the second end of carrier rod to secure the riser in the first raised position.

10. A vehicle transport system comprising:
    a vehicle transport trailer configured to be coupled to a truck, the vehicle transport trailer comprising at least one upper platform and at least one lower platform;

a riser coupled to the at least one lower platform, the riser comprising a top surface configured to receive a vehicle driven onto the riser, the riser including a front end and a back end opposite the front end;

at least one leg, a first end of the leg rotatably attached to the riser near the front end of the riser;

a rotating member attached to the second end of the at least one leg;

a lift mechanism attached to the rotating member, the lift mechanism configured to cause the rotating member to rotate;

a carrier rod coupled to the riser near the back end of the riser; and a latch configured to engage an end of the carrier rod to secure the riser in a first raised position and a second lowered position, the latch including a release mechanism configured to cause a portion of the latch to rotate, wherein rotating the lift mechanism:
  causes the front end of the riser to move both in a first generally horizontal direction and a first generally vertical direction to the first raised position such that the front end of the riser is supported by the at least one leg,
  causes the back end of the riser to move in the first generally horizontal direction, and
  causes the latch to engage the carrier rod to secure the riser in the first raised position, and wherein rotating the release mechanism in the first direction:
  causes the latch to release the carrier rod,
  causes the front end of the riser to move in a second generally horizontal direction opposite the first horizontal direction and in a second generally vertical direction opposite to the first vertical direction to the second lowered position, and
  causes the back end of the riser to move in the second generally horizontal direction.

11. The system of claim 10, wherein once the riser is in the second lowered position the latch engages the carrier rod to secure the riser in the second lowered position.

12. The system of claim 10, wherein the latch further comprises:
a base portion with a slot formed through the base portion, the slot configured to receive an end of the carrier rod such that the end of the carrier rod may travel in the slot; and
a rotatable catch portion coupled to the release mechanism, an edge of the catch in contact with the end of the carrier rod protruding from the slot of the base portion,
wherein at least two indentations configured to receive the end of the carrier rod are formed in the edge of the catch, each of the at least two indentations separated by a protrusion configured to allow movement of the carrier rod in the first direction but prevent movement of the carrier rod in the second direction.

13. The system of claim 12, wherein a first indentation in the catch is located such that when carrier rod is received in the first indentation the riser is secured in the first raised position and a second indentation in the catch is located such that when the carrier rod is received in the second indentation the riser is secured in the second lowered position.

14. The system of claim 13, wherein a third indentation in the catch is located such that when the carrier rod is received in the third indentation the riser is secured in a third intermediate position between the first raised position and the second lowered position.

15. The system of claim 14, wherein the riser may be placed in the third intermediate position by using the lift mechanism to lift the riser from the second lowered position to the third intermediate position or by using the release mechanism to lower the riser from the first raised position to the third intermediate position.

16. The system of claim 12, wherein the latch further comprises a locking mechanism configured to prevent the catch from rotating when the carrier rod is received by one of the at least two indentations.

17. The system of claim 16, wherein the locking mechanism comprises:
a foot extending outwards from a side of the catch; and
a pin configured to engage the foot when the carrier rod is received by one of the at least two indentations.

18. The system of claim 10, wherein the latch is affixed to a first side of the riser, the riser system further comprising:
a second latch affixed to the second side of the riser, the second latch configured to engage a second end of the carrier rod to secure the riser in a first raised position and a second lowered position, the second latch coupled to the release mechanism in a manner to allow a portion of the second latch to rotate, and
wherein rotating the lift mechanism further causes the second latch to engage the second end of carrier rod to secure the riser in the first raised position.

* * * * *